(12) United States Patent
Pappenheimer et al.

(10) Patent No.: US 10,100,764 B2
(45) Date of Patent: Oct. 16, 2018

(54) METHOD AND DEVICE FOR RAISING AND/OR LOWERING AN EXHAUST GAS TEMPERATURE OF A COMBUSTION ENGINE HAVING AN EXHAUST GAS AFTERTREATMENT DEVICE ARRANGED IN AN EXHAUST LINE

(71) Applicant: MAN Truck & Bus AG, Munich (DE)

(72) Inventors: Andreas Pappenheimer, Ellingen (DE); Andreas Sommermann, Heilsbronn (DE)

(73) Assignee: MAN Truck & Bus AG, Munich (DE)

( * ) Notice: Subject to any disclaimer, the term of this patent is extended or adjusted under 35 U.S.C. 154(b) by 64 days.

(21) Appl. No.: 15/014,651

(22) Filed: Feb. 3, 2016

(65) Prior Publication Data
US 2016/0237931 A1  Aug. 18, 2016

(30) Foreign Application Priority Data

Feb. 12, 2015 (DE) .................. 10 2015 001 797

(51) Int. Cl.
| | |
|---|---|
| *F01N 3/20* | (2006.01) |
| *F02D 41/00* | (2006.01) |
| *F02D 41/02* | (2006.01) |
| *F02B 39/10* | (2006.01) |
| *F01N 3/023* | (2006.01) |
| *F01N 3/02* | (2006.01) |

(52) U.S. Cl.
CPC .......... *F02D 41/0245* (2013.01); *F01N 3/02* (2013.01); *F01N 3/0235* (2013.01); *F01N 3/2046* (2013.01); *F02B 39/10* (2013.01); *F02D 41/0007* (2013.01); *F02D 41/024* (2013.01); *F01N 2430/08* (2013.01); *F02D 2041/0265* (2013.01); *Y02T 10/144* (2013.01); *Y02T 10/26* (2013.01)

(58) Field of Classification Search
CPC ........ F01N 3/02; F01N 3/0235; F01N 3/2046; F01N 2430/08; F02B 39/10; F02D 41/0007; F02D 41/024; F02D 41/0245; F02D 2041/0265; Y02T 10/144; Y02T 10/26
See application file for complete search history.

(56) References Cited

U.S. PATENT DOCUMENTS

| | | |
|---|---|---|
| 6,637,204 B2 | 10/2003 | Ellmer et al. |
| 2002/0083700 A1 | 7/2002 | Ellmer et al. |
| 2006/0236692 A1 | 10/2006 | Kolavennu et al. |
| 2010/0263639 A1 | 10/2010 | Uhrich et al. |
| 2011/0107739 A1 | 5/2011 | Shimizu et al. |

FOREIGN PATENT DOCUMENTS

| | | |
|---|---|---|
| DE | 4325004 A1 | 2/1994 |
| DE | 10062377 | 6/2002 |
| DE | 102007056102 | 5/2009 |
| EP | 1431529 A1 | 6/2004 |
| EP | 2302184 | 3/2011 |

OTHER PUBLICATIONS

Search Report dated Mar. 24, 2016 which issued in the corresponding European Patent Application No. 16000041.0.

*Primary Examiner* — Brandon Lee
(74) *Attorney, Agent, or Firm* — Cozen O'Connor

(57) ABSTRACT

A method and a control device for raising and/or lowering an exhaust gas temperature of a combustion engine having an exhaust gas aftertreatment device arranged in an exhaust line sets the exhaust gas temperature for the exhaust gas aftertreatment using an electric-motor mode and/or a generator mode of an electrified exhaust turbocharger.

8 Claims, 3 Drawing Sheets

METHOD AND DEVICE FOR RAISING AND/OR LOWERING AN EXHAUST GAS TEMPERATURE OF A COMBUSTION ENGINE HAVING AN EXHAUST GAS AFTERTREATMENT DEVICE ARRANGED IN AN EXHAUST LINE

BACKGROUND OF THE INVENTION

1. Field of the Invention

The invention relates to a method for raising and/or lowering an exhaust gas temperature of a combustion engine having an exhaust gas aftertreatment device arranged in an exhaust line. The invention furthermore relates to a control device for raising and/or lowering an exhaust gas temperature of a combustion engine having an exhaust gas aftertreatment device arranged in an exhaust line.

2. Related Art

The fact that pollutant emissions from a combustion engine can be reduced in an effective manner by catalytic aftertreatment of the exhaust gas with the aid of an exhaust gas aftertreatment system, e.g., one having an exhaust gas catalyst, is known from practical experience. However, it is an important precondition for this that the catalyst has reached its light off temperature. Below this light off temperature, the exhaust gas catalyst is ineffective or not very effective, and the reaction takes place only at insufficiently low conversion rates. Particularly in systems with exhaust turbocharging, the heatsink formed by the exhaust turbine means that reaching catalyst light off in an optimum manner for emissions is extremely important in avoiding high pollutant emissions. In the case of combustion engines of this kind, it is thus necessary to take precautions to ensure that the exhaust gas catalyst reaches its light off temperature as quickly as possible.

In order to raise the exhaust gas temperature to a light off temperature, one known practice is to adjust the injection parameters of the combustion engine in such a way, for example, that the adjusted injection parameters bring about an increase in the exhaust gas temperature. This can be achieved by retarding the start of injection, for example.

Other known measures require the adjustment of a throttle valve, the activation of a burner system additionally introduced into the exhaust line or the closure of an engine braking flap. The disadvantage with the abovementioned approaches is that additional components, e.g., a burner system, an engine braking flap, etc., have to be provided and disadvantages in terms of efficiency have to be accepted.

European Patent Application EP 1 431 529 A1, for example, discloses a method and a device for raising and/or lowering an exhaust gas temperature of a combustion engine having an exhaust gas aftertreatment device arranged in an exhaust line, wherein the exhaust gas temperature is raised or lowered by gas introduced into the exhaust line. The gas introduction device used for this purpose can be an inserted nozzle configured as an injector or a shut-off nozzle inserted in the exhaust line or an ejector pump. The disadvantage of this technique is that an additional introduction device is necessary.

A combustion engine having an exhaust gas aftertreatment device in the form of a particulate filter is furthermore known from DE 43 25 004 C2. In the case of this particulate filter, raising (or lowering) the exhaust gas temperature in order to control the burn off process in the particulate filter is achieved by throttling (or de-throttling) the exhaust gas flowing through the exhaust line. This is achieved by a flap in the filter housing, which is pivoted by a thermostatically controlled linkage. In addition, an electric heater is provided for the thermostat and the particulate filter. This system is of complex construction and requires a large number of specially manufactured components. Thus, the particulate filter material must have a precisely defined contour to allow the pivoting motion of the flap. Moreover, effective control is only possible in relation to the raising of the exhaust gas temperature.

SUMMARY OF THE INVENTION

It is thus an object of the present invention to provide an improved method and an improved device for raising and/or lowering an exhaust gas temperature of a combustion engine having an exhaust gas aftertreatment device arranged in an exhaust line, by which disadvantages of conventional systems can be avoided.

These objects achieved by devices and methods explained in greater detail in the following description with reference in some cases to the figures.

According to one aspect the invention, a method for setting, in particular raising and/or lowering, an exhaust gas temperature of a combustion engine having an exhaust gas aftertreatment device arranged in an exhaust line is provided. According to general aspects of the invention, an electric-motor mode and/or a generator mode of an electrified exhaust turbocharger is used to set the exhaust gas temperature for exhaust gas aftertreatment. The combustion engine is in the fired mode during the carrying out of the method.

An electrified exhaust turbocharger is known per se from the prior art and is also referred to as an exhaust turbocharger, which can be operated by electric motor or assisted by electric motor. The electrified exhaust turbocharger has an electric machine, which can be coupled or is coupled in a torque-transmitting manner to the drive shaft of the exhaust turbocharger or, in general, to the rotor. The electric machine is provided for driving or assisting the driving of the exhaust turbocharger (also referred to below as the electric-motor mode of the exhaust turbocharger) and/or can be operated as a generator by the exhaust turbocharger. The rotor of the exhaust turbocharger is formed by the exhaust turbine, the compressor and the drive shaft, wherein the exhaust turbine and the compressor are coupled by the drive shaft in terms of motion. It is already known from practical experience that the pressure-charging process of the combustion engine can be assisted temporarily by the electric motor of an electric-motor-assisted exhaust turbocharger, in particular to bridge the "turbo lag" when starting off.

Setting the exhaust gas temperature for exhaust gas aftertreatment by an electric-motor mode and/or a generator mode of an electrified exhaust turbocharger offers the advantage, in particular, that, in the case of vehicles already fitted with electrified exhaust turbochargers, further additional systems for raising the exhaust gas temperature, e.g., a burner, a throttle valve or an additional compressor, can be omitted or that, when the exhaust turbocharger is used in accordance with the invention in combination with these conventional approaches, it is possible to achieve a more rapid rise in the exhaust gas temperature.

According to a preferred illustrative embodiment of the invention, the electric-motor mode and/or the generator mode of the electrified exhaust turbocharger is started after satisfaction of at least one activation condition for activation of an exhaust gas temperature management. The term "exhaust gas temperature management" means the selective raising and/or lowering of the exhaust gas temperature. If the corresponding mode has already started at this point in time, it can be adapted, if appropriate, to ensure that the exhaust gas temperature approaches a setpoint temperature or a setpoint temperature range as quickly as possible. Here, the satisfaction of the activation condition indicates that the exhaust gas temperature should be modified in order, for example, to allow optimum operation of the exhaust gas aftertreatment device.

In an advantageous variant of this embodiment, the generator mode of the electrified exhaust turbocharger is started when the satisfaction of at least one activation condition indicates that the current exhaust gas temperature needs to be increased, e.g., if the actual exhaust gas temperature is below a light off temperature of an exhaust gas aftertreatment device. A generator mode of the exhaust turbocharger has the effect that the kinetic energy of the rotor is partially converted into electrical energy and, as a result, the rotor is braked. This reduces the boost pressure or air mass flow of the combustion engine. Owing to the reduced boost pressure, the air ratio (lambda) falls and produces hot exhaust gas. The use of the generator mode of the exhaust turbocharger to increase the exhaust gas temperature furthermore reduces the disadvantages in respect of efficiency in comparison with the approaches known from the prior art.

According to another advantageous variant of this embodiment, the electric-motor mode of the electrified exhaust turbocharger is started or adapted when the satisfaction of at least one activation condition indicates that the current exhaust gas temperature needs to be reduced. In particular, an electric-motor mode of the exhaust turbocharger comprises electric motor-assisted operation of the exhaust turbocharger, in which the electric machine additionally accelerates the rotor of the exhaust turbocharger. The exhaust turbocharger rotor accelerated to a higher speed increases the air mass flow and the air ratio (lambda) and thereby leads to a reduction in the exhaust gas temperature. This offers the advantage that the combustion engine and the exhaust gas aftertreatment device can be protected from overheating.

One possibility for implementation according to the invention furthermore envisages that at least one of the following measures is carried out when the satisfaction of at least one activation condition indicates that the current exhaust gas temperature needs to be increased: (a) adjustment of the throttle valve, (b) closure of an engine braking flap, (c) activation of an additional burner system arranged on the exhaust line, and (d) adjustment of the injection parameters of the combustion engine in such a way that the adjusted injection parameters bring about an increase in the exhaust gas temperature, wherein a retardation of the start of injection and/or an increase in the metered quantity of fuel introduced can be performed, for example, to raise the exhaust gas temperature.

In other words, the setting of the exhaust gas temperature in accordance with the invention using an electric-motor and/or motor mode of the electrified exhaust turbocharger can be combined with conventional measures and methods for adapting the exhaust gas temperature, thereby making it possible to achieve a particularly rapid increase in the exhaust gas temperature.

According to another variant of the illustrative embodiment, in which the use of the exhaust turbocharger in accordance with the invention for the exhaust gas temperature management is combined with at least one of the conventional measures for adapting the exhaust gas temperature, an electric-motor mode of the exhaust turbocharger is started in the case of transient operating states in order to increase the exhaust gas temperature. Transient operating states are non-steady operating states, e.g., a starting process or a shifting process, in which the exhaust gas energy/quantity fed to the turbine of the exhaust turbocharger fluctuates greatly. In these transient operating states, the electric motor of the exhaust turbocharger thus compensates for the fluctuations in the exhaust gas energy/quantity by an electric-motor mode ("boost" mode). In transient operating states, the electric-motor mode compensates for the greatly fluctuating air mass flow in transient operating states, thus allowing the conventional measures to be employed more effectively.

According to another aspect of the invention, an activation condition for activating an exhaust gas temperature management, which indicates that the exhaust gas temperature needs to be increased, can be the undershooting of a lower temperature limit value by the exhaust gas temperature. The lower temperature limit value can preferably be a light off temperature of the exhaust gas aftertreatment device, e.g., of an exhaust catalyst.

According to another variant, an activation condition for activating an exhaust gas temperature management, which indicates that the exhaust gas temperature needs to be increased, can be the presence of an idling and/or part-load operating state of the combustion engine. According to this variant, a generator mode of the exhaust turbocharger to raise the exhaust gas temperature is thus employed only in idling and/or part-load operating states. In these operating states, more rapid heating of the exhaust gas is of particular significance since it otherwise generally takes an above-average time for the exhaust gas aftertreatment device to warm up to the light off temperature owing to the reduced combustion power in these operating states.

In addition to the monitoring of the exhaust gas temperature, it is possible as an alternative or in addition to use other parameters as a condition for activating the exhaust gas temperature management: for example, an activation condition for activating an exhaust gas temperature management can be determined on the basis of a particular value of at least one engine temperature sensor, wherein the at least one engine temperature sensor measures an intake air temperature, an engine cooling water temperature and/or an engine oil temperature. Low temperatures of the engine cooling water or of the engine oil indicate, for example, that the engine is in the cold-running or warmup mode, in which the temperature of the exhaust gas aftertreatment device has likewise not been warmed up sufficiently without additional measures.

Another possibility here envisages that an activation condition for activating an exhaust gas temperature management is determined on the basis of an operating phase of the combustion engine, wherein the operating phase indicates whether the engine is in cold-running mode, warm-up mode or warm mode and/or whether the combustion engine has been operated in the overrun mode for longer than a predetermined time. Such operating states correlate, in turn, with the temperature state of the exhaust gas aftertreatment device since the exhaust gas aftertreatment device generally has a temperature below the light off temperature in the cold-running mode, the warm-up mode or after a prolonged overrun mode or unfired mode.

The raising and/or lowering, described above, of the exhaust gas temperature using the electrified exhaust turbocharger is preferably carried out temporarily until the exhaust gas temperature has reached a desired setpoint value or setpoint range.

According to another aspect of the invention, a control device for setting, in particular raising and/or lowering, an exhaust gas temperature of a combustion engine having an exhaust gas aftertreatment device arranged in an exhaust line is provided. The control device is designed to check whether at least one activation condition for activating an exhaust gas temperature management has been satisfied and, if yes, to activate an electrified exhaust turbocharger of the combustion engine to establish an electric-motor and/or a generator mode of the electrified exhaust turbocharger in order to set the exhaust gas temperature.

In particular, the control device can be embodied to carry out the method as disclosed herein. To avoid repetition, features which are disclosed purely in the context of the method shall also be deemed to be applicable and claimable in the context of the device.

The invention furthermore relates to a motor vehicle, in particular a commercial vehicle, having a combustion engine pressure-charged by an electrified exhaust turbocharger, having a control device as disclosed in this document.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described preferred embodiments and features of the invention can be combined in any desired manner with one another. Further details and advantages of the invention are described below with reference to the attached drawings, in which.

DETAILED DESCRIPTION OF THE PRESENTLY PREFERRED EMBODIMENTS

Figure 1:
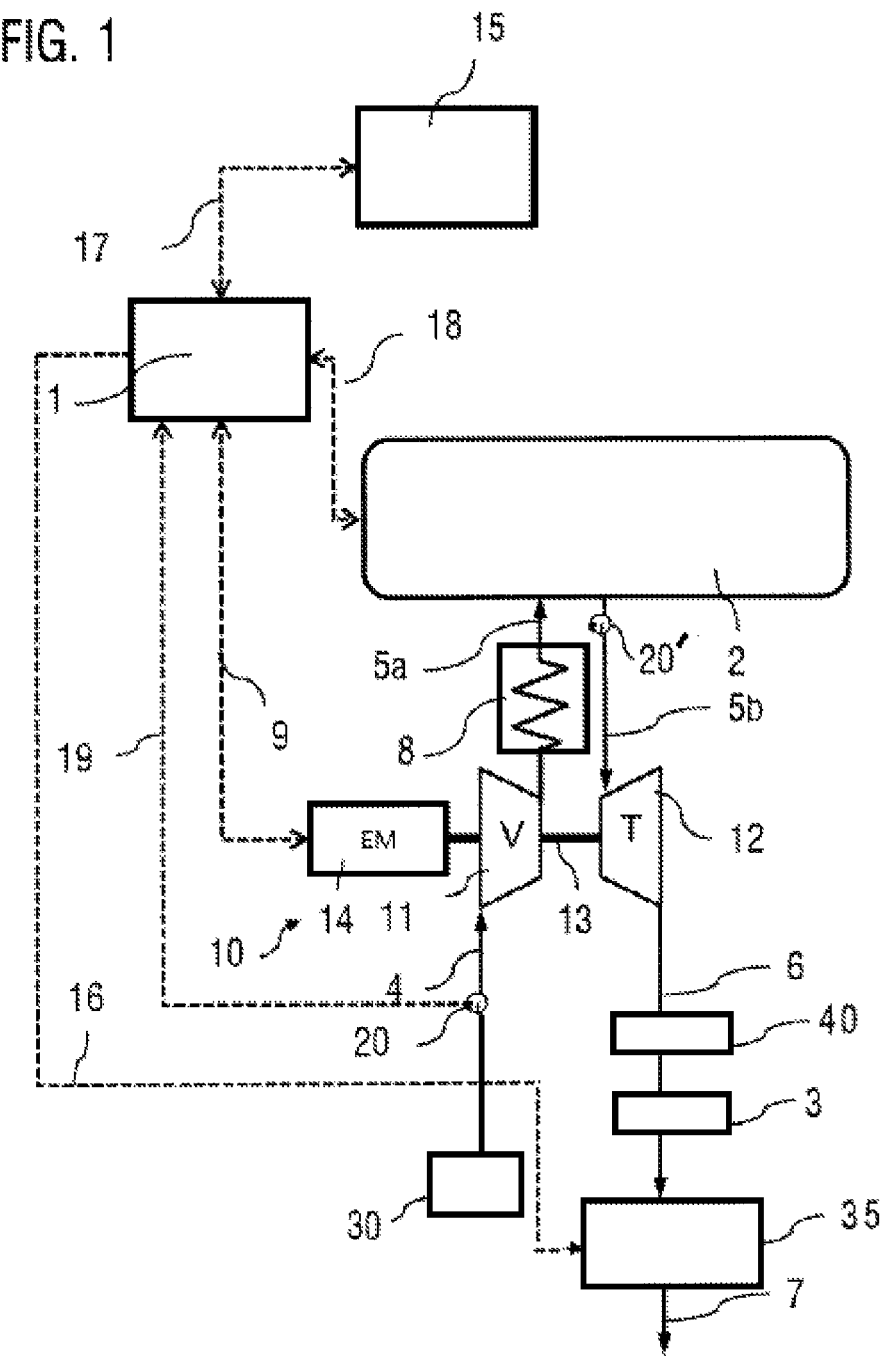
FIG. 1 shows a schematic block diagram illustrating a control device for setting the exhaust gas temperature by activating an electrified exhaust turbocharger according to one embodiment of the invention.

FIG. 1 schematically shows a pressure-charged combustion engine 2 of a commercial vehicle, typically a diesel engine, and an electrified exhaust turbocharger 10 associated therewith, also referred to below as ETC, in the form of a highly schematized block diagram. The ETC 10 comprises a turbine 12, which is driven by the exhaust gas from the combustion engine 2, which is fed to the turbine 12 via the exhaust line 5b. After this, the exhaust gas mixture flows via the turbine outlet through an exhaust line 6, in which an exhaust gas aftertreatment device 3 known per se, e.g., in the form of an exhaust catalyst, is arranged. After passing through the exhaust gas aftertreatment device 3, the exhaust gas flows via another exhaust line 7 to the exhaust.

The turbine 12 is connected to a compressor 11 by a shaft 13. Fresh air is fed to the compressor 11 via the compressor inlet line 4. The compressor 11 compresses the charge air to be fed to the combustion engine 2 and thus boosts the power of the combustion engine 2 in normally fired operation. The charge air compressed by the compressor 11 is fed via a charge air line to a charge air cooler 8 and is then fed into the combustion engine 2 via line 5a.

The ETC 10 is embodied as an electrified exhaust turbocharger, that is to say an electric-motor-assisted exhaust turbocharger. For this purpose, the ETC 10 is provided with an electric machine 14, which can be operated as a motor and, as a generator, can be coupled or is coupled in a torque-transmitting manner to the drive shaft 13 and is provided for the purpose of driving or assisting with the driving of the rotor, comprising the compressor 11, the turbine 12 and the shaft 13, of the exhaust turbocharger.

The motor mode and the generator mode of the electric machine 14, e.g., an electric motor, are controlled by a control device 1, which is connected for this purpose, via electric lines, to the electric machine 14 and to an energy storage device 15 for electrical energy, e.g., a starter battery or a high-voltage battery of a hybridized drive train, the electric line between the control device 1 and the electric machine 14 being indicated schematically by the dotted line 9 and the electric connection between the control device 1 and the energy storage device 15 being indicated schematically by the dotted line 17. For the motor mode of the electric machine 14, this energy is supplied by the energy storage device 15. The power generated in the generator mode of the electric machine 14 can be fed to the energy storage device 15 via the control device 1.

In the illustrative embodiment under consideration, the control device 1 is furthermore embodied as a controller which can actively perform exhaust gas temperature management in order to raise and/or lower an exhaust gas temperature. Here, the controller, which is configured to comprise a microprocessor for example, is connected to the combustion engine 2 via the control line 18 in order to supply the engine 2 with modified injection parameters, e.g., retardation of the starter injection, in order to raise the exhaust gas temperature.

The control device 1 is furthermore configured to control the operation of the exhaust gas aftertreatment device 3, this being indicated by the electric line 16. Line 16 connects the sensors of the drive train and/or of the exhaust gas aftertreatment system to the control device 1. By the sensors, it is possible in a manner known per se to measure the exhaust gas temperature after the turbine 12, the temperature ahead of and/or after a catalytic converter or particulate filter, a differential temperature, a pressure ahead of and/or after a catalytic converter or particulate filter or the differential pressure, for example.

The control device 1 is configured to control the exhaust gas temperature and to continuously receive data from various engine temperature sensors. For example, there is a temperature sensor 20 arranged in the compressor inlet line 4, the sensor measuring the temperature of the intake air and transmitting the measured values to the control device 1 via the signal line 19. The control device 1 receives measured values from further temperature sensors (not shown in FIG. 1), which measure the exhaust gas temperature and the temperature of the engine cooling water and of the engine oil in a known manner.

One special feature is that the control device 1 is preferably configured to activate the ETC 10 as part of the exhaust gas temperature management, in particular to raise the exhaust gas temperature through a generator mode of the ETC 10 or, if appropriate, to lower the exhaust gas temperature through an electric-motor mode of the ETC 10.

Figure 2:
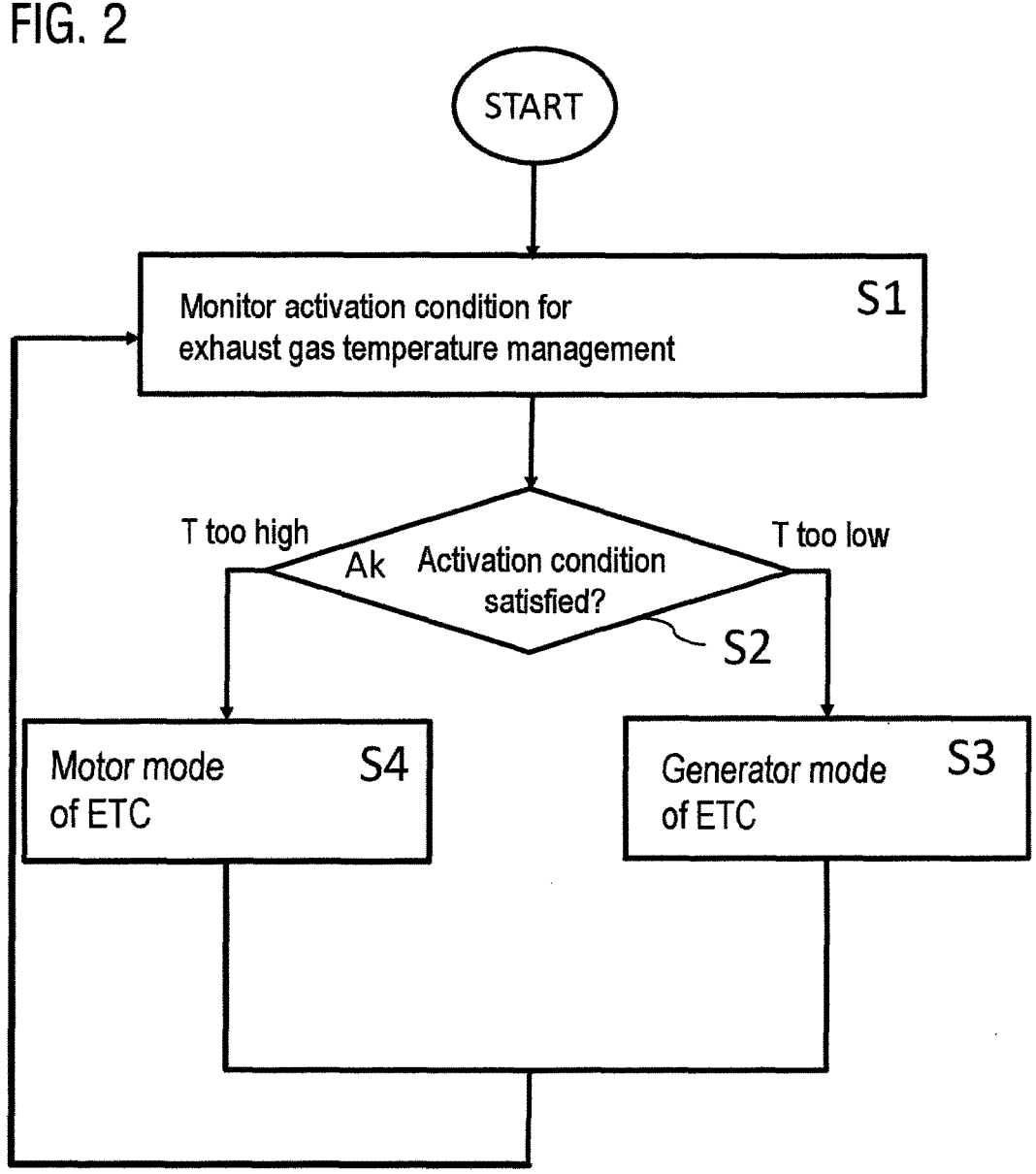
FIG. 2 shows a flow diagram of a method for raising and/or lowering the exhaust gas temperature according to one embodiment of the invention.

The corresponding mode and the corresponding method are illustrated, by way of example, in the flow diagram in FIG. 2.

In a first step S1, the control device 1 monitors, in the fired mode of the combustion engine 2, whether a predetermined activation condition for an exhaust gas temperature management in which the exhaust gas temperature will be increased or reduced selectively has been satisfied. Here, the satisfaction of the activation condition indicates that the exhaust gas temperature should be actively modified, e.g., to allow optimum operation of the exhaust gas aftertreatment device 3. The activation condition is satisfied and indicates that the exhaust gas temperature should be raised, for example, when the actual exhaust gas temperature in the exhaust line 5b is below the light off temperature of the exhaust gas aftertreatment device 3. To monitor this activation condition, the control device 1 can continuously monitor the measured values from the exhaust gas temperature sensor 20'. As a further activation condition, the control device can check whether the combustion engine 2 is in a cold-running or warm-up mode since, in these operating states, the exhaust gas aftertreatment device 3 has generally likewise not yet warmed up sufficiently. When the current exhaust gas temperature needs to be increased, at least one of the following measures is carried out when the satisfaction of at least one activation condition indicates that: (a) adjustment of the throttle valve 30, (b) closure of an engine braking flap 35, (c) activation of an additional burner system arranged on the exhaust line 40, and (d) adjustment of the injection parameters of the combustion engine in such a way that the adjusted injection parameters bring about an increase in the exhaust gas temperature.

As an alternative, the control device 1 can monitor the activation condition using engine temperature sensors, which measure the temperature of the intake air, of the engine water or of the engine oil. If the measured temperature values are each below a predetermined temperature threshold, the control device 3 can infer from this that the activation temperature of the exhaust gas aftertreatment device 3 has not been reached. Such temperature thresholds can be determined experimentally on a test rig, for example.

According to the illustrative embodiment under consideration, the system checks, as a further activation condition for the generator mode of the ETC 10 whether an idling or part-load operating state is present. In other words, an exhaust gas temperature that is too low is only raised actively by a generator mode of the ETC 10 when an idling or part-load operating state is present.

Figure 3:
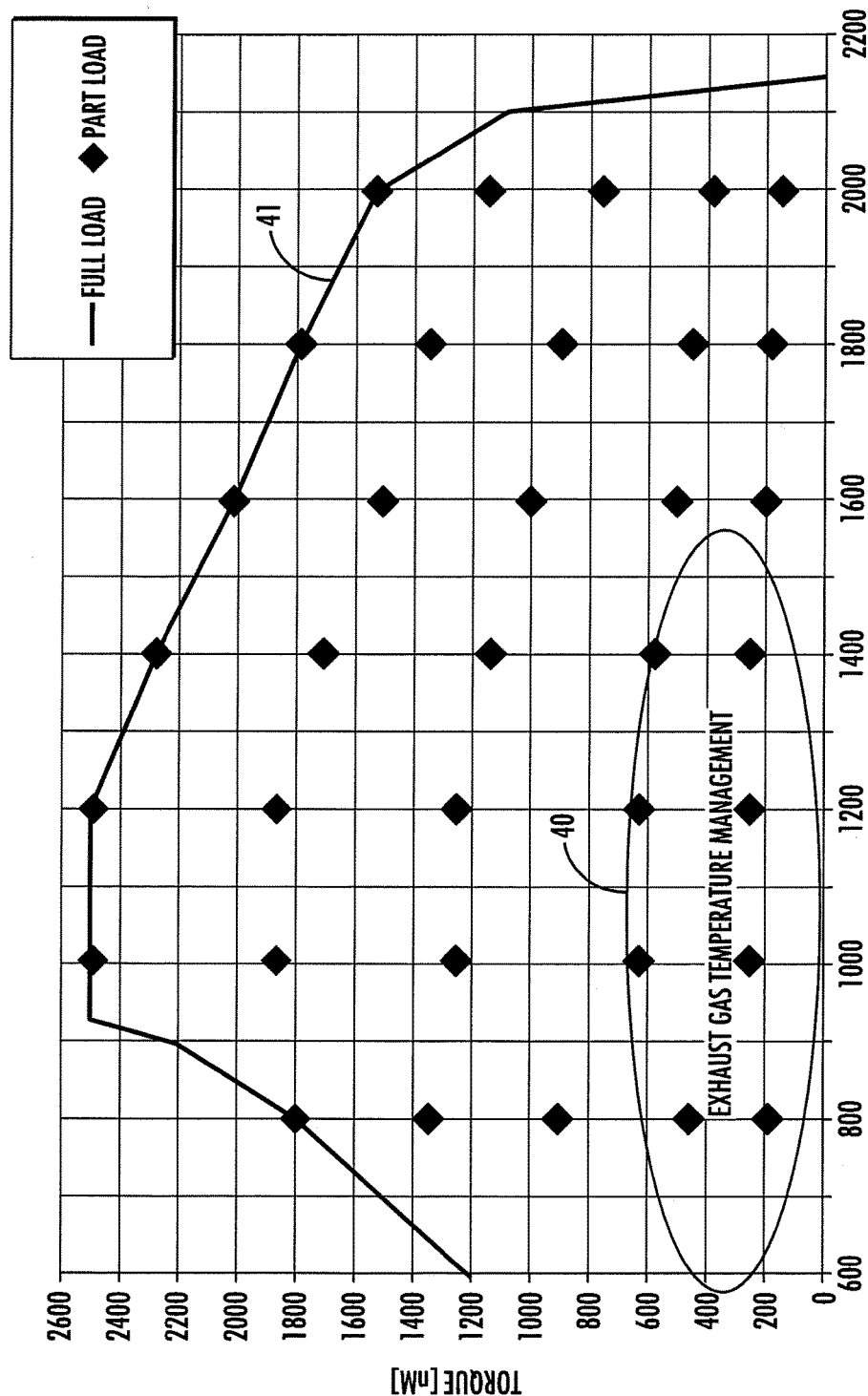
FIG. 3 shows an engine operating map illustrating the operating points at which the exhaust gas temperature management according to one embodiment of the invention is activated.

FIG. 3 shows an engine operating map to illustrate operating states of this kind. The curve denoted by the reference sign 41 represents the full-load limit curve of the engine operating map. The region of operating points, which are surrounded by the line denoted by 40, represent operating points, in the part-load mode of an illustrative commercial vehicle engine for which exhaust gas temperature management is carried out. For an illustrative commercial vehicle combustion engine, the part-load operating states are those operating points at which the engine speed is in a speed range of from 600 to 1600 revolutions per minute and in a torque range of from 0 to 700 Nm.

Returning to step S2, of the flow chart of FIG. 2, the control device 1 thus checks whether the activation condition has been satisfied. If this is the case and the activation condition furthermore indicates that the exhaust gas temperature should be actively raised, step S3 is then carried out, in which the control device 1 starts a generator mode of the electric machine 14 of the ETC 10.

In the generator mode, the electric machine 14 coupled to the drive shaft 13 of the rotor in terms of motion is accelerated by the rotor (11, 12, 13) supplied with exhaust gas energy from the combustion engine, with the result that the kinetic energy of the rotor (11, 12, 13) is partially converted into electrical energy and, as a result, the rotor is braked. Consequently, a generator mode of the exhaust turbocharger has the result that the boost pressure or air mass flow of the combustion engine is reduced. Owing to the reduced boost pressure, the air ratio (lambda) falls and produces hotter exhaust gas during combustion.

The temporary generator mode of the ETC 10 is ended when the temperature of the exhaust gas has exceeded the light off temperature of the exhaust gas aftertreatment device. The method is then continued again with step S1.

As already mentioned above, one particular advantage of the invention consists furthermore in that the method can be used analogously to lower the exhaust gas temperature in order to protect the combustion engine 2 and the exhaust gas aftertreatment device 3 if the exhaust gas temperature is too high. For this purpose, there is furthermore monitoring, in step S1, of activation conditions that indicate an exhaust gas temperature which is too high. Consequently, the system furthermore checks in step S2 whether there is a case of an exhaust gas temperature which is too high. This would be the case, for example, if the exhaust gas temperature exceeded a predetermined upper limit value for the exhaust gas temperature. In this case, step S4 is then carried out.

In step S4, the ETC 10 is driven by the electric motor, i.e., the rotor (11, 12, 13) of the ETC 10 is additionally accelerated by the electric-motor mode of the ETC 10.

Owing to the acceleration of the rotor to a higher speed, the air mass flow increases and leads to a lowering of the exhaust gas temperature. The temporary electric-motor-assisted mode of the ETC 10 is ended if the exhaust gas temperature value has fallen below the upper limit value. The method is then continued again with step S1.

The invention is not restricted to the preferred illustrative embodiments described above. On the contrary, a large number of variants and modifications which likewise make use of the inventive concept and therefore fall within the scope of protection is possible. In particular, the invention also claims protection for the subject matter and the features of the dependent claims independently of the claims to which they refer.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or sug-

What is claimed is:

1. A method for raising or lowering an exhaust gas temperature of a combustion engine having an exhaust gas aftertreatment device arranged in an exhaust line, the method comprising:
   using an electric-motor mode or a generator mode of an electrified exhaust turbocharger to set the exhaust gas temperature for exhaust gas after-treatment by adjusting a boost pressure of the combustion engine; and
   starting the electric-motor mode or the generator mode of the electrified exhaust turbocharger after satisfaction of at least one activation condition for activation of an exhaust gas temperature management, wherein the step of starting includes:
   increasing a current exhaust gas temperature directly by reducing the boost pressure of the combustion engine by starting the generator mode of the electrified exhaust turbocharger, which brakes a rotor of the electrified exhaust turbocharger, when the satisfaction of the at least one activation condition indicates that the current exhaust gas temperature needs to be increased, and
   reducing the current exhaust gas temperature directly by increasing the boost pressure of the combustion engine by starting the electric-motor mode of the electrified exhaust turbocharger, which accelerates a rotor of the electrified exhaust turbocharger, when the satisfaction of the at least one activation condition indicates that the current exhaust gas temperature needs to be reduced.

2. The method according to claim 1, further comprising, when the satisfaction of the at least one activation condition indicates that the current exhaust gas temperature needs to be increased, carrying out at least one selected from the group consisting of the following measures:
   (a) adjustment of a throttle valve,
   (b) closure of an engine braking flap,
   (c) activation of a burner system arranged on the exhaust line, and
   (d) adjustment of injection parameters of the combustion engine such that the adjusted injection parameters bring about an increase in the exhaust gas temperature, wherein a retardation of the start of injection and/or an increase in the metered quantity of fuel introduced takes place.

3. The method according to claim 2, wherein the electric-motor mode of the electrified exhaust turbocharger is started when
   (a) satisfaction of the at least one activation condition indicates that the current exhaust gas temperature needs to be increased, and
   (b) a transient operating state of the combustion engine is present.

4. The method according to claim 1, wherein the at least one activation condition for activating the exhaust gas temperature management, which indicates that the exhaust gas temperature needs to be increased, is an undershooting of a lower temperature limit value by the exhaust gas temperature, the lower temperature limit value being a light off temperature of the exhaust gas aftertreatment device.

5. The method according to claim 1, wherein the at least one activation condition for activating the exhaust gas temperature management, which indicates that the exhaust gas temperature needs to be increased, is a presence of an idling or part-load operating state of the combustion engine.

6. The method according to claim 1, wherein the at least one activation condition for activating the exhaust gas temperature management is determined on the basis of at least one selected from the group consisting of:
   (a) the measured values of at least one engine temperature sensor, wherein the at least one engine temperature sensor measures an intake air temperature, an engine cooling water temperature and/or an engine oil temperature; and
   (b) an operating phase of the combustion engine, wherein the operating phase indicates whether the combustion engine is in cold-running mode, warmup mode or warm mode and/or whether the combustion engine has been operated in the overrun mode for longer than a predetermined time.

7. A control device configured to raise or lower an exhaust gas temperature of a combustion engine having an exhaust gas aftertreatment device arranged in an exhaust line, wherein the control device is configured to:
   determine whether at least one activation condition for activating an exhaust gas temperature management has been satisfied,
   activate an electrified exhaust turbocharger of the combustion engine to establish an electric-motor or a generator mode of the electrified exhaust turbocharger to set the exhaust gas temperature by adjusting a boost pressure of the combustion engine, and
   start the electric-motor mode or the generator mode of the electrified exhaust turbocharger after satisfaction of at least one activation condition for activation of an exhaust gas temperature management, wherein the step of starting the electric motor mode or the generator mode includes:
   increasing the current exhaust gas temperature directly by reducing the boost pressure of the combustion engine by starting the generator mode of the electrified exhaust turbocharger, which brakes a rotor of the electrified exhaust turbocharger, when the satisfaction of the at least one activation condition indicates that the current exhaust gas temperature needs to be increased, and
   reducing the current exhaust gas temperature directly by increasing the boost pressure of the combustion engine by stating the electric-motor mode of the electrified exhaust turbocharger, which accelerates a rotor of the electrified exhaust turbocharger, when the satisfaction of the at least one activation condition indicates that the current exhaust gas temperature needs to be reduced.

8. A vehicle comprising:
   a combustion engine pressure-charged by an electrified exhaust turbocharger; and
   a control device according to claim 7.

* * * * *